(12) United States Patent
Lehmann et al.

(10) Patent No.: US 7,486,394 B2
(45) Date of Patent: Feb. 3, 2009

(54) OPTICAL MEASURING HEAD

(75) Inventors: Peter Lehmann, Göttingen (DE); Peter Lücke, Karlsruhe (DE); Jürgen Mohr, Sulzfeld (DE); Carlos Javier Moran-Iglesias, Stutensee (DE); Wolfgang Osten, Lilienthal (DE); Aiko Ruprecht, Stuttgart (DE); Sven Schönfelder, Löwenstein (DE)

(73) Assignee: Carl Mahr Holding GmbH, Göttingen (DE)

( * ) Notice: Subject to any disclaimer, the term of this patent is extended or adjusted under 35 U.S.C. 154(b) by 148 days.

(21) Appl. No.: 11/514,538

(22) Filed: Sep. 2, 2006

(65) Prior Publication Data

US 2007/0046935 A1 Mar. 1, 2007

Related U.S. Application Data (63) Continuation-in-part of application No. PCT/EP2005/002245, filed on Mar. 3, 2005.

(30) Foreign Application Priority Data

Mar. 4, 2004 (DE) ............... 10 0004 011 189.8

(51) Int. Cl.
*G01J 3/00* (2006.01)

(52) U.S. Cl. ............... 356/300; 359/367

(58) Field of Classification Search ............... 356/300; 600/176; 385/12; 359/367, 656
See application file for complete search history.

(56) References Cited

U.S. PATENT DOCUMENTS

| | | | | |
|---|---|---|---|---|
| 3,901,220 | A * | 8/1975 | Koyasu et al. | 600/176 |
| 4,140,364 | A * | 2/1979 | Yamashita et al. | 359/367 |
| 5,785,651 | A | 7/1998 | Kuhn et al. | |
| 6,564,087 | B1 | 5/2003 | Pitris et al. | |
| 6,891,984 | B2 * | 5/2005 | Petersen et al. | 385/12 |
| 7,154,083 | B2 * | 12/2006 | Mizuno | 250/234 |
| 7,217,241 | B2 * | 5/2007 | Guenier et al. | 600/179 |
| 2002/0159055 | A1* | 10/2002 | Bennett et al. | 356/301 |
| 2004/0165184 | A1* | 8/2004 | Mizuno | 356/326 |

FOREIGN PATENT DOCUMENTS

DE 101 61 486 A 1 7/2003
GB 2 355 310 A 4/2001

* cited by examiner

*Primary Examiner*—Kara E Geisel
(74) *Attorney, Agent, or Firm*—R. S. Lombard; K. Bach (57) ABSTRACT

A measuring head (4) according to the invention comprises the combination of a zone lens (26), which is preferably a diffractive lens, with a hemispherical lens (23) or a GRIN lens (33). This represents a concept capable of miniaturization, resulting in very slender measuring heads (4) having a high numeric aperture and, accordingly, leads to the best resolution capacity. Such measuring heads are insensitive to angular errors as concerns the orientation of the measuring head to the surface to be measured or to an oblique positioning of the surface relative to the optical axis of the measuring head.

21 Claims, 6 Drawing Sheets

OPTICAL MEASURING HEAD

CROSS-REFERENCE TO RELATED APPLICATION

This is a continuation-in-part application of international application PCT/EP2005/002245 filed Mar. 3, 2005, and claiming the priority of German application 10 2004 011 189.8 filed Mar. 4, 2004.

BACKGROUND OF THE INVENTION

The invention relates to an optical measuring head designed particularly for the surface measurement at difficult to access locations.

In the surface measuring technology tactile sensors play, as before, an important role. The measuring speed, however, is limited. Further, to the object to be measured a measuring force has to be applied which in case of sensitive surfaces, thin films or the like may lead to difficulties. Also, in tight locations the measuring force to be applied may deform the feeler element which, in case of unfavorable feeler geometries, for example, in the measuring of very deep bores, leads to uncertainties in the measurement.

Optical sensors do not have these disadvantages. The measuring speed, however, is eventually determined by the number of available photons with which a scanning of the objects without application of force is possible. It is, in principle, also feasible to detect 3D geometries. Optical sensors, however, are based on light reflected by the object, whereby numerous noise effects may appear. For example, at the edges deflection effects appear. A surface roughness may give rise to interfering speckle formation. Also, angles of inclination between the surface normals at the scanned point of the object and the optical axis of the sensor may be tolerated only to a limited extent.

For measuring bores in workpieces, for example, DE 102 56 273 A1 describes an optical line sensor, with which the wall of bores may be optically detected on an entire line. For this purpose the line sensor comprises an interferometer adjoined by an optical plate which acts as a dual prism. The light incident at one edge exits at an edge offset at 90° and is thus guided essentially perpendicularly to the wall surface.

This sensor is a special sensor which is particularly adapted for scanning surfaces which are linear in one direction, such as cylinder walls.

Further, DE 101 61 486 discloses a confocal line sensor having an object lens with several light exit windows formed as Fresnel lenses and oriented toward the workpiece. These lenses are deflection prisms to which, on the input side, optical fibers are connected. A focusing optical element is disposed between the respective optical fiber and the prism input. The prism effects a 90° deflection of light. Within the prism a parallel beam is presupposed. Such a sensor requires that the workpiece surface to be measured be oriented perpendicularly to the optical axes of the Fresnel lenses at the output side. This renders the measuring of unknown surface geometries difficult.

Accordingly, it is the object of the invention to provide a measuring head which may be used for measuring cylindrical and slightly conical bores, as well as other, difficult to access workpiece locations.

SUMMARY OF THE INVENTION

A measuring head (4) according to the invention comprises the combination of a zone lens (26), which is preferably a diffractive lens, with a hemispherical lens (23) or a GRIN lens (33). This represents a concept capable of miniaturization, resulting in very slender measuring heads (4) having a high numeric aperature and, accordingly, leads to the best resolution capacity. Such measuring heads are insensitive to angular errors as concerns the orientation of the measuring head to the surface to be measured or to an oblique positioning of the surface relative to the optical axis of the measuring head.

The measuring head according to the invention is distinguished by an object lens having a large numeric aperture. It further comprises a mirror which lets the light to enter and exit laterally to the longitudinal axis of a light-admitting and light-removing optical fiber. The object lens comprises two focusing optical elements which have a total numerical aperture >0.1. Such a large numerical aperture results not only in achieving a large optical resolution in measuring the workpiece surface but, beyond that, it renders the measurement insensitive concerning faulty alignments of the workpiece surface relative to the optical axis of the object lens. Lesser angular errors may be tolerated, so that the measuring head also provides for the measurement of conical surfaces or other surface contours.

Two structural designs of the measuring head according to the invention have been found to be particularly advantageous. A first family of embodiments is based on a hemispherical or spherical cap-shaped lens which has a mirror-coated surface or which lies against a mirror-coated surface and thus makes possible a light deflection as well as a prefocusing of light. In addition, a further focusing element is disposed in the light path. The further focusing element is, for example, a diffractive element in the form of a zone plate, a zone lens, a diffractive lens or a deflection-optical lens. A diffractive, that is, a deflection-optical lens is preferred; it has a high chromatic aberration which is desirable.

A second family of embodiments is based on the prefocusing of light exiting from an optical fiber by means of a GRIN lens (Gradient Index Lens) which is adjoined by a deflecting mirror and a second focusing element, such as a diffractive element, for example, a zone plate, a zone lens, a diffractive lens or a deflection-optical lens. It is feasible to integrate this element into the mirror, so that the mirror then constitutes a deflection-optical, focusing mirror. The use of a GRIN lens is particularly advantageous from the point of view of a micro-optical realization of the object lens. The GRIN lens is formed by a transparent cylinder, whose planar surfaces constitute the light inlet and the light outlet surfaces. The lens material has an index of refraction which varies as a function of the radius, whereby the desired focusing properties are achieved. The manufacture of GRIN lenses having very small dimensions, such as a lens diameter of less than 1 mm, is possible with high precision.

It is a common characteristic of both the above-outlined families that the first focusing element performs a pre-focusing of the light into a convergent light beam. The second focusing element focuses the light beam further. In this manner a high numerical aperture is obtained.

Preferably, the measuring head works with non-chromatic light, such as colored or white light, having a continuous spectrum at least in a certain frequency range. Such a light may originate, for example, from an incandescent lamp, a high-pressure discharge lamp or other light sources. By virtue of the high chromatic aberration of at least one of the two focusing elements, a highly effective sharpness of depth of the object lens is achieved despite the high numeric aperture. The focal points of the different, light-containing wavelengths are arranged along the optical axis. Therefore, the sensor detects with the object lens the light only of that wavelength, in the focal point of which the surface of the object lens lies. The screen formed by the end face of the fiber core filters out the other wavelengths. The measuring head is preferably designed as a confocal microscope. The received light is submitted to a spectral analysis. The detected light color is a measure for the distance of the detected surface point from the object lens.

Object lenses of the above-described constructions may be combined into a line sensor without difficulties due to their small dimensions. Therefore, line-like portions of a workpiece surface may be measured in a simple, brief measuring process. The obtained measuring head is slender, so that even difficult to access workpiece portions may be easily measured.

BRIEF DESCRIPTION OF THE DRAWINGS

For a better understanding of the invention reference may be made to the accompanying drawings, which illustrates exemplary embodiments of the invention, in which.

DESCRIPTION OF THE PREFERRED EMBODIMENTS

Figure 1:
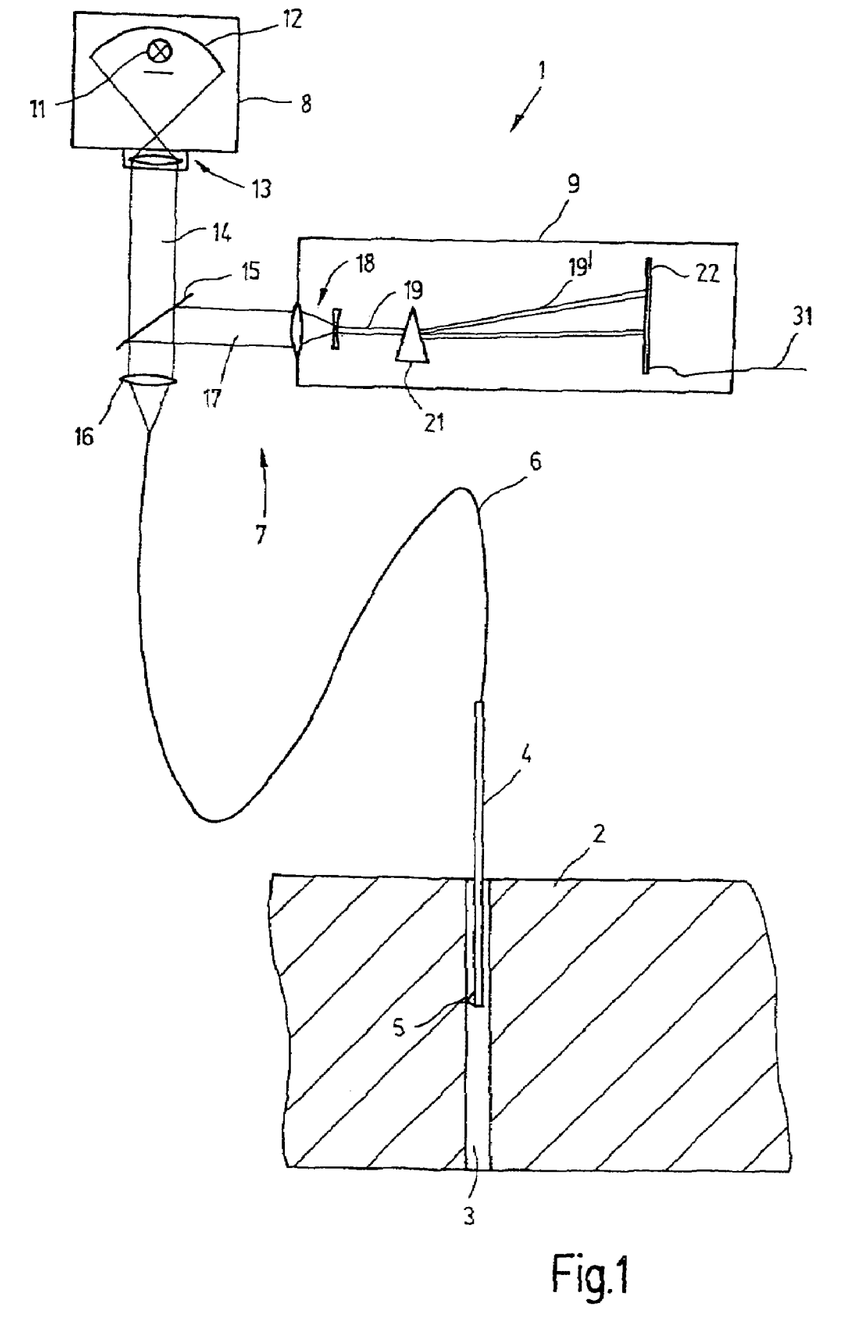
FIG. 1 is a schematic illustration of a measuring device including a measuring head according to the invention, shown during measuring a workpiece.

FIG. 1 shows a measuring device 1 for measuring the surface of a workpiece 2, also, in particular, at very difficult to access locations, such as the inside of a bore 3. For this purpose a slender measuring head 4 is provided which may be introduced into the bore 3. The measuring head 4 is based on an optical measuring principle and scans the surface of the bore 3 optically at a dot-like location 5. The measuring head 4 is moved by a non-illustrated positioning device. For this purpose it forms part, for example, of a coordinate measuring machine.

The measuring head 4 is coupled to a measuring unit 7 by means of an optical cable which has at least one optical fiber 6. The measuring unit 7 comprises a light source 8 and a light receiver 9.

The light source 8 includes a broad-band, essentially dot-like light means 11, such as a suitable incandescent lamp, for example, a reflector 12 which directs its light on a collecting lens 13. In this manner, an essentially parallel light beam 14 is generated which eventually serves for illuminating the location 5. For this purpose, the light beam 14 first passes through a semi-transparent mirror 15 and is thereafter coupled into the optical fiber of the optical cable by means of a further collecting lens 16. As a light source, a semiconductor-based light source may also be used, such as a superluminescent diode in which an optical fiber is directly coupled to the light-emitting surface of the semiconductor material. The semi-transparent mirror 15 may be replaced by a Y-coupler.

The light received by the measuring head 4 is guided back to the semi-transparent mirror 15 through the optical fiber 6 and the collecting lens 16. The mirror 15 uncouples the light as a light beam 17 and directs it to the light receiver 9.

The light receiver 9 comprises a lens assembly 18 which significantly reduces the diameter of the light beam 17, so that a basically line-like light beam 19 remains. The latter is deflected by a prism 21 according to the light color (wavelength) and impinges on a multi-line photo detector 22 or another location-sensitive sensor. The location on which the deflected light beam 19' impinges, characterizes the wavelength of the light. The receiving fiber may also be directly coupled to a suitable spectrometer in which a spectral splitting is effected, for example, by an optical grid.

Figure 2:
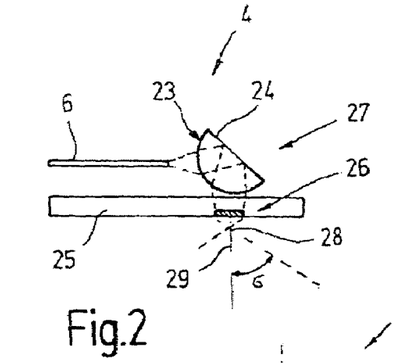
FIG. 2 is a schematic illustration of a first embodiment of the measuring head having a hemispherical lens.

FIG. 2 schematically shows a first embodiment of the measuring head 4. The measuring head 4 comprises a hemispherical lens 23 on which impinges the light emanating divergently from the optical fiber 6. The hemispherical lens 23 has a mirror-coated, preferably planar surface 24 (or lies against a mirror) which is arranged preferably at an angle of 45° to the length direction of the optical fiber 6. This applies at least to measuring heads 4 operating with laterally perpendicularly exiting light. If other exit directions are desired, the surface 24 of the lens 23 may be accordingly arranged at another angle.

The lens 23 is fastened to and held by, a non-illustrated securing means on a carrier 25 which may be, for example, of a transparent plastic. At the location at which the light, reflected and pre-focused by the lens 23, passes through the carrier 25, a zone lens 26 may be worked into the latter. The zone lens 26 is preferably a diffractive element. The plastic utilized preferably has a high index of refraction. The lens 23, with its mirror-coated surface 24 forms, together with the zone lens 26, an object lens which has only an extremely small dimension transversely to the carrier 25 and the optical fiber 6. Furthermore, the object lens has an overall very high numeric aperture of >0.1, preferably >0.3. Magnitudes of 0.5 and above may be obtained. The numeric aperture A is calculated by the formula:

$$A = n \cdot \sin \sigma; \text{ where}$$

$\sigma$ is one half of the opening angle of the object lens 27 formed by the lens 23 with the surface 24 and the zone lens 26 and n is the index of refraction of the medium between the object lens and its focal point 28.

The high numeric aperture provides for a measurement of workpiece surfaces even if the latter are not necessarily oriented perpendicularly to the optical axis 29 of the object lens 27.

The measuring head 4 has a high chromatic aberration which is essentially caused by the zone lens 26 designed on purpose for achieving a high chromatic aberration. The focal length decreases with increasing wavelength of light (negative longitudinal chromatic aberration). However, deflection-optical elements refractive lenses, may be used which have a positive longitudinal chromatic aberration, that is, the focal length increases with the wavelength of light.

The measuring device 1 described up to this point operates as follows:

The measuring head 4 is first positioned in front of the workpiece surface in such a manner that at least one of its various colored focal points arranged along the axis 29 lies on the location 5 of the workpiece surface. Strictly speaking, infinite number of focal points lie distributed along a portion of the optical axis 29; neighboring focal points differ from one another in color only in an infinitesimal manner. Then the light source 8 couples the light into the measuring head 4 through the optical fiber 6 for illuminating the location 5. The workpiece surface lies at a location of the optical axis 29 which corresponds to the focal point of a determined wavelength of light. The reflected light is again received by the object lens 27. By virtue of the substantially dot-like end surface of the optical fiber, from the reflected, received light only the light of the focal point is received and guided to the light receiver 9 which performs a spectral analysis. The photo detector 22 generates at an output conductor 31 an output signal characterizing the detected wavelength of light from which the distance between the object lens 27 or between the measuring head 4 and the workpiece surface may be obtained.

In case of the object lens 27 of FIG. 2, the possibility to achieve a high numeric aperture is obtained by using the hemispheric lens 23 in conjunction with the zone lens 26.

Figure 3:
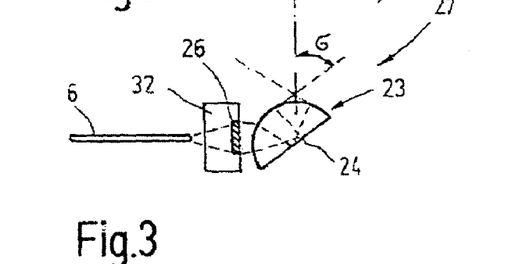
FIG. 3 is a schematic illustration of second embodiment of the measuring head having a hemispherical lens.

A modified embodiment of the object lens 27 according to the invention is shown in FIG. 3. As in the preceding described embodiment, the light path is shown in broken lines. The zone lens 26, however, is disposed in front of the lens 23, that is, between the lens 23 and the light inlet and light outlet of the optical fiber 6. Again, an object lens 27 with a large numeric aperture is obtained, that is, an object lens 27 having a large opening angle 2σ. The zone lens 26 may again be formed on a plastic carrier which projects into the light path with an extension 32.

Figure 4:
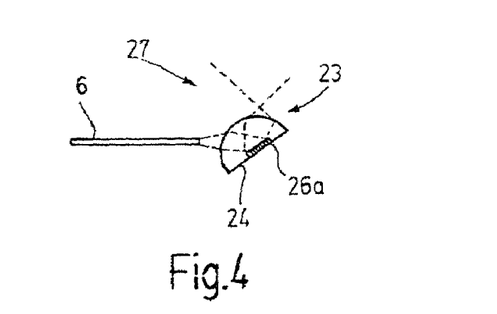
FIG. 4 is a schematic illustration of a third embodiment of the measuring head having a hemispherical lens.

As shown in FIG. 4, it is also feasible to combine the lens 23 with the zone lens 26. The hemispherical or spherical cap-shaped lens 23 is, for that purpose, at its mirror-coated surface 24, which is preferably a planar surface, provided with a zone structure 26a which causes a high chromatic aberration. The lens 23 results in an object lens having a short focal length and a high numeric aperture.

It is a common characteristic of all the preceding described embodiments that they utilize, as an essential element, the spherical cap-shaped or hemispherical lens 23. Such lenses may be made in rational manufacturing processes with extremely small dimensions with high precision, making possible a miniaturization of the described measuring head 4.

Figure 5:
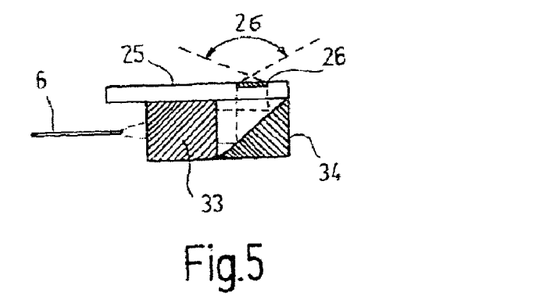
FIG. 5 is a schematic illustration of a first embodiment of the measuring head having a GRIN (Gradient Index Lens) lens.
Figure 6:
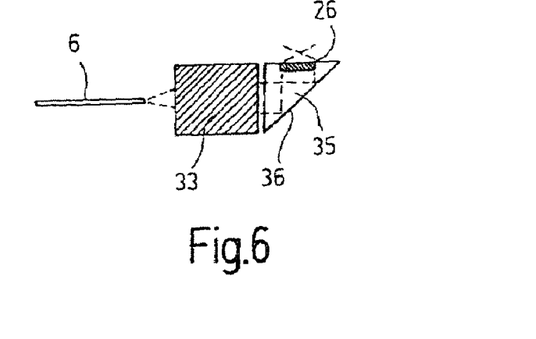
FIG. 6 is a schematic illustration of a first embodiment of the measuring head having a GRIN (Gradient Index Lens) lens.
Figure 7:
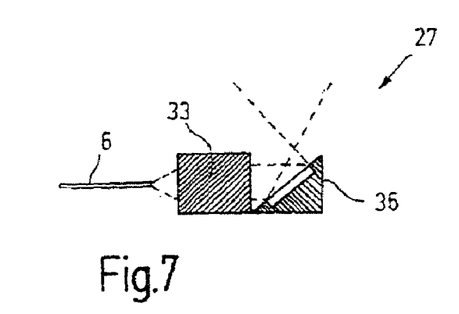
FIG. 7 is a schematic illustration of second embodiment of the measuring head having a GRIN (Gradient Index Lens) lens.

FIGS. 5 to 7 show other, equally miniaturization-friendly embodiments of the measuring head 4. First, reference is made to FIG. 5. In the embodiment shown therein, on the carrier 25 a GRIN lens 33 is arranged. A GRIN lens has a basic cylindrical shape where the index of refraction, starting from the central optical axis, varies radially outward, so that a focusing effect is obtained. The optical fiber 6 directs the light to a planar end face of the GRIN lens 33. Therebehind, at the opposite side, a mirror 34 is disposed which emits the previously bundled light outward, laterally through the carrier 25. On the carrier 25 the diffractive structure is formed as the zone lens 26, whereby in the immediate vicinity of the workpiece surface a large opening angle 2σ is obtained. The latter is preferably greater than 35°, that is, NA>0.3.

As shown in FIG. 6, instead of the mirror 34, a prism 35 may be provided which has a mirror-coated base surface 36. The sides which are oriented, preferably perpendicularly to one another, constitute the light inlet and the light outlet. At the light outlet, again a zone lens 26 is arranged, to obtain the large opening angle 2σ. Between the GRIN lens 33 and the light outlet of the optical fiber 6 a free air path, or, in the alternative, a light-conducting solid element, such as a glass body, a glass rod, a plastic body, a plastic rod or the like may be provided. Likewise, between the GRIN lens 33 and the prism 35 an air gap, or, in the alternative, a light-conducting solid element, such as a glass body, a glass rod, a plastic body, a plastic rod or the like may be provided. The GRIN lens 33 may be directly set on the prism 35 or may be worked thereinto for forming a part thereof. Instead of the GRIN lens 33, the end of the optical fiber 6 defining the light outlet may be itself formed as an optical element, such as a collecting lens. For this purpose, in the simplest case, the end of the optical fiber 6 may be melted into a spherical shape.

FIG. 7 illustrates a further embodiment of the invention where the GRIN lens 33 is combined with a diffractive reflector 36. The GRIN lens 33 is arranged in the light path, after the optical fiber 6. The after-arranged diffractive reflector 36 generates, on the one hand, the desired high chromatic aberration and, on the other hand, effects at the same time the lateral deviation of the light and the short focal length of the object lens 27 which manifests itself in the large opening angle 2σ. Both the GRIN lens 33 and the diffractive reflector 36 are miniaturization-friendly elements, so that the object lens 27 may have an extremely small structure.

Figure 8:
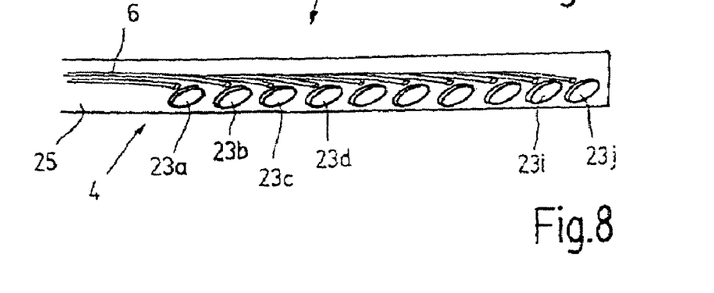
FIG. 8 shows an optical line sensor formed of several dot sensors according to one of the embodiments of FIGS. 2 to 4.

FIG. 8 shows an example of a line sensor 37 constituted by a series of dot sensors. The dot sensors may be designed according to one of the preceding described embodiments. In the example shown in FIG. 8, the sensor according to FIG. 2 serves as a basis. The optical cable includes a plurality of optical fibers; one for each measuring point. Accordingly, each fiber is coupled to its own, non-illustrated light receiver, corresponding to the light receiver 9 of FIG. 1. With each optical fiber a respective hemispherical lens 23 (23a to 23j) is associated; the geometrical relationships are arranged according to FIG. 2. In the carrier 25 the zone lenses 26 are arranged underneath the obliquely positioned lenses 23a to 23j. In FIG. 8, the zone lenses 26 are hidden by the lenses 23a to 23j. Thus, the latter direct the light downward, perpendicularly to the drawing plane, so that the optical axes of the thus-formed individual object lenses enter perpendicularly the drawing plane in a spaced, parallel relationship to one another.

Such a line sensor 37 may be arranged in the measuring head 4 according to FIG. 1 for covering a larger line-like portion of the wall of the bore 3. Because of the small dimensions of the individual sensors or individual object lenses, these may be approached very closely one another, and a measuring head 4 may be provided which has a diameter of, for example, barely more than 2 mm. Thus, an examination of workpieces and their measuring is feasible even in a very tight space.

In case of a distance sensor, the invention utilizes the confocal/chromatic measuring principle in such a manner that at a minimum diameter of the measuring head, an angular deflection of the light used for the measurement, combined with a large numeric aperture and a longitudinal resolution in the sub-micrometer range are obtained. A particularity of the solution according to the invention resides in that the light divergently exiting from an axially arranged fiber is collimated and focused in at least two consecutive steps. After the partial collimation, after the complete collimation or after the complete collimation including a pre-focusing, an angular deflection in the desired measuring direction occurs. The final focusing is effected either after the angular deflection or simultaneously therewith. The distance measurement is based on the wavelength split of the focal point along the optical axis and the spectral analysis of the light coupled back into the fiber. The desired spectral split may be obtained by a combination of achromatic elements or elements with a positive longitudinal chromatic aberration, as well as elements with a negative longitudinal chromatic aberration. Such elements are, for example, refractive lenses and diffractive lenses. The required optical elements may be entirely or partially of micro-optical design. The last focusing occurs preferably by means of a diffractive element worked into a carrier substrate. Such an element may be made of a polymer and may have holding structures for the optical fiber and/or the optical elements (lenses and mirror). It is also feasible to combine several dot-like measuring sensors into a linearly measuring sensor.

The collimation, the pre-focusing and the angular deflection are preferably effected by an obliquely positioned hemispherical lens 23 having a mirror-coated planar surface 24 which is positioned in front of a focusing diffractive element 26. In the alternative, and likewise in a miniaturization-friendly manner, a GRIN lens or another refractive lens may be used in front of a planar mirror for collimation and pre-focusing. The planar mirror serves for the angular deflection. Behind the mirror a focusing diffractive element is disposed. In the alternative, the diffractive element may be integrated in the mirror.

It is also feasible to first perform a pre-collimation by a diffractive element 26 which is positioned in front of an obliquely oriented hemispherical lens which has a mirror-coated planar surface and which serves for collimation, pre-focusing, angular deflection and focusing. It is further feasible to first perform a collimation and, occasionally, a pre-focusing by a GRIN lens or another refractive lens, where the subsequent angular deflection is effected by a prism in which its surface oriented toward the object lens or the planar mirror surface is, for focusing, provided with a diffractive structure.

Figure 9:
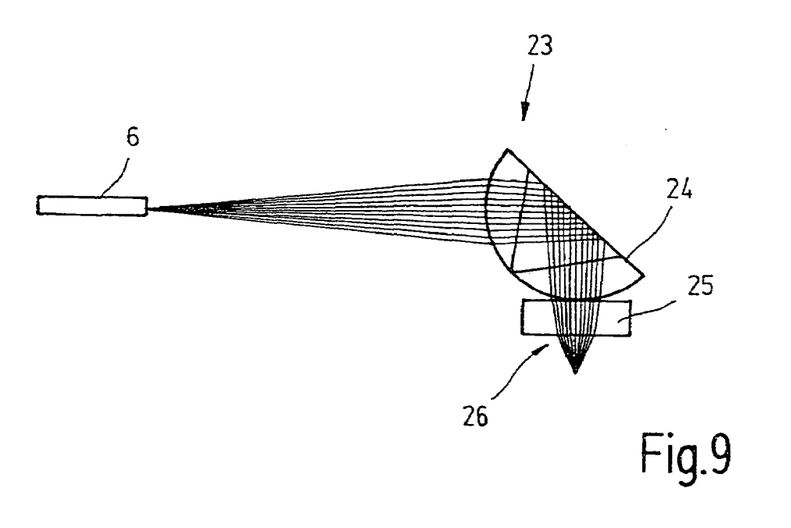
FIG. 9 is a schematic illustration of a first embodiment of the measurement head optical dot sensors having hemispherical lenses.
Figure 10:
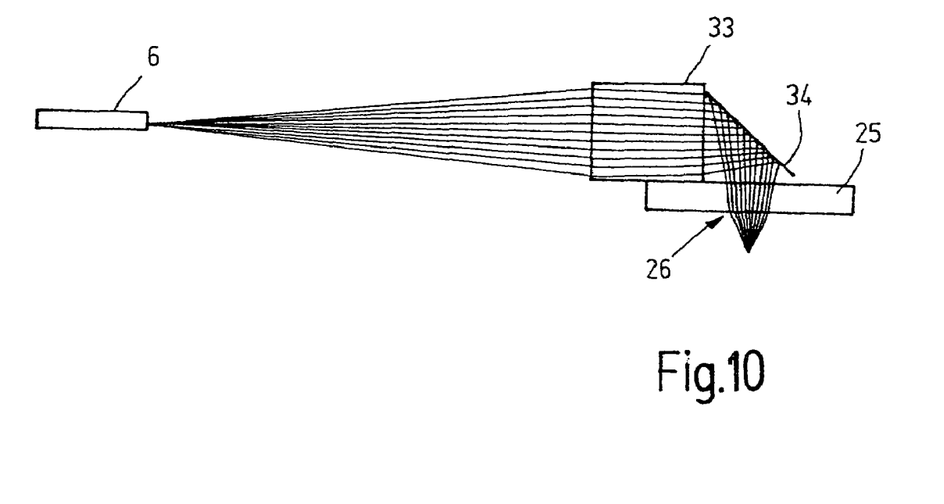
FIG. 10 is a schematic illustration of a second embodiment of the measurement head optical dot sensor having GRIN lenses.
Figure 11:
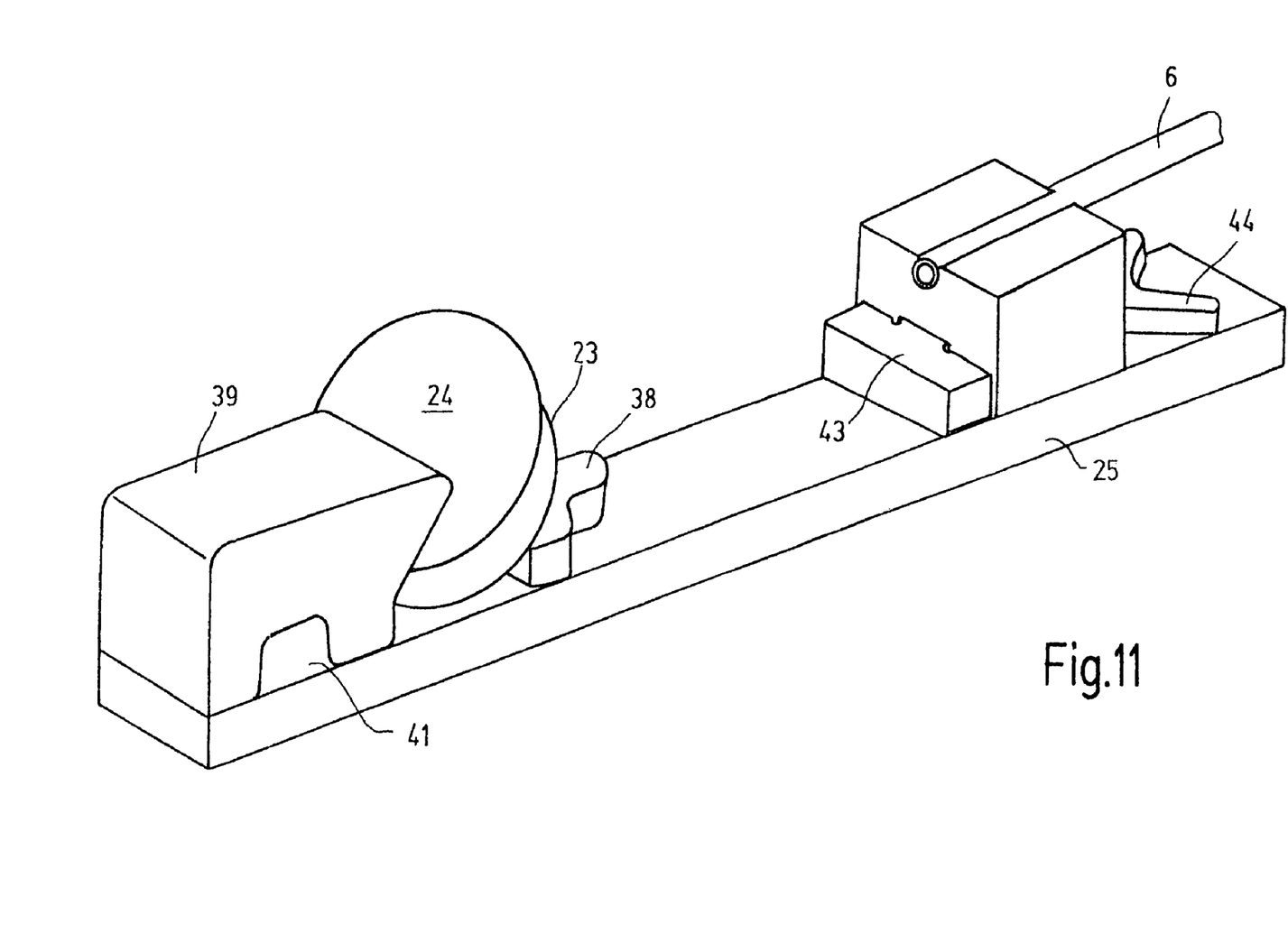
FIG. 11 is a perspective view showing of the dot sensor according to FIG. 9.
Figure 12:
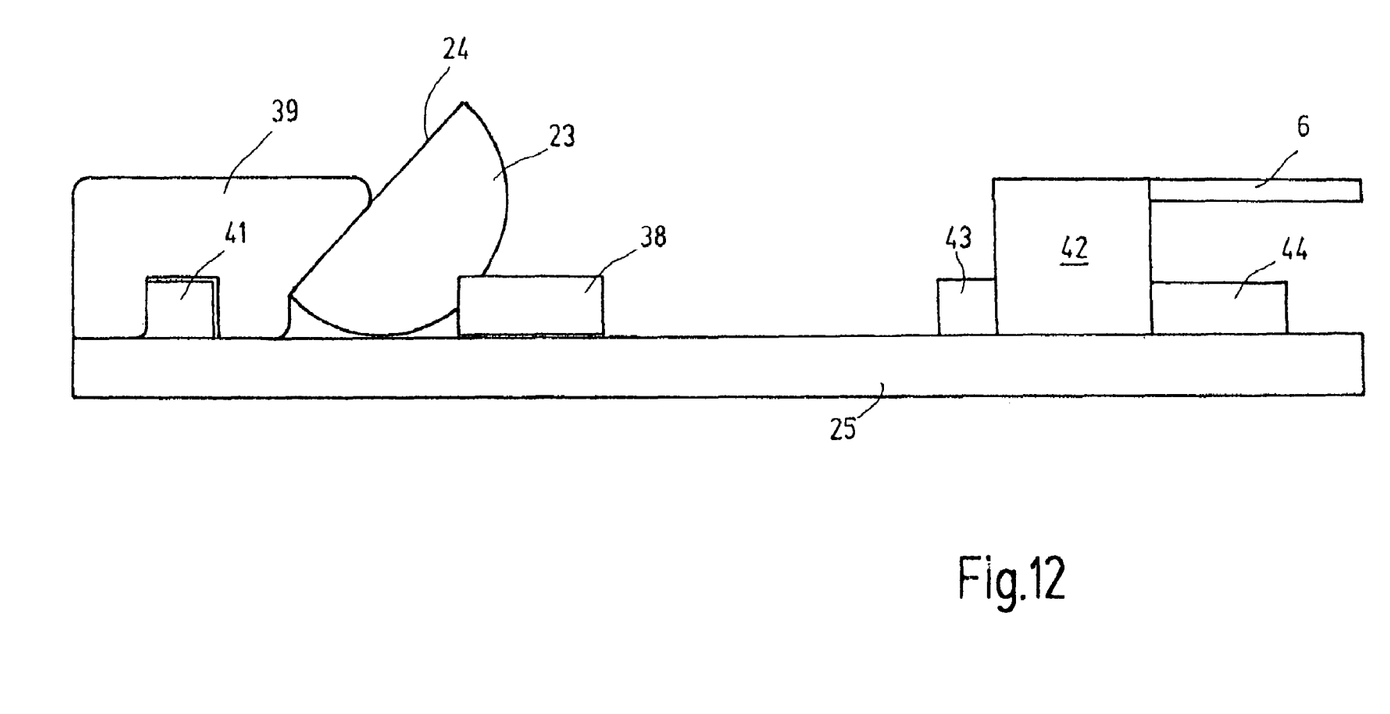
FIG. 12 is a side elevation view of the dot sensor according to FIGS. 9 and 11; and, FIG. 13 is a perspective view of the dot sensor according to FIG. 10.

FIGS. 9 and 10 show preferred embodiments of a realization of the sensor according to the invention. In the embodiment according to FIG. 9, the lens 23 is mirror-coated on its surface 24. It is held closely above the carrier 25 or is connected therewith. On the carrier 25 a zone lens 26, for example, in the form of a diffractive element, is formed. The lens 23 acts as a refractive element. The practical embodiment of this dot sensor is illustrated in FIGS. 11 and 12. The carrier 25 is, for example, of quartz glass. The lens 23 is held in a correct position between the holder elements 38, 39. The holder element 38 is approximately Y-shaped and is connected with the carrier 25, for example, it is glued thereto. The holder element 39 has a planar surface which lies on the surface 24 and thus defines the orientation of the lens 23. The latter floats above the carrier 25 or contacts it in one point. The holder element 39 is seated on a holder piece 41 which is, for example, glued to, or otherwise connected with, the carrier 25.

The optical fiber 6 is held at a slight distance from the lens 23. For this purpose a holder block 42 is provided which is set on the carrier 25 and is, for example, held with a form fit by holder structures 43, 44 which are formed on the holder 25.

In the embodiment according to FIG. 10, instead of the lens 23, a combination of a GRIN lens 33 with an after-connected mirror 34 is provided. The GRIN lens 33 may be directly secured to the carrier 25 which, in addition, may have a holder structure carrying the mirror 34. The carrier 25 is preferably of a plastic or quartz glass or a similar material. Preferably a 0.3 mm thick quartz glass substrate is used on which the diffractive structures required for forming the zone lens 26 and holder structures may be formed. The practical realization of the dot sensor according to FIG. 10 is shown in perspective in FIG. 13. The GRIN lens 33 is supported by holder structures 45 positioned between both sides of its lateral surface. The holder structures are formed on, or secured to, the carrier 25. Between the holder structures 45 which support the GRIN lens 33 and a holder structure 46 which is formed on or formed from the carrier 25 or is otherwise connected therewith, a mirror element 47 is supported which has an oblique surface facing the GRIN lens 33. It may be at a distance from the GRIN lens 33 or may slightly overlap the same and thus fix its position. The planar surface oriented toward the GRIN lens is mirror-coated and thus constitutes the mirror 34, as seen in FIG. 10.

Figure 13:
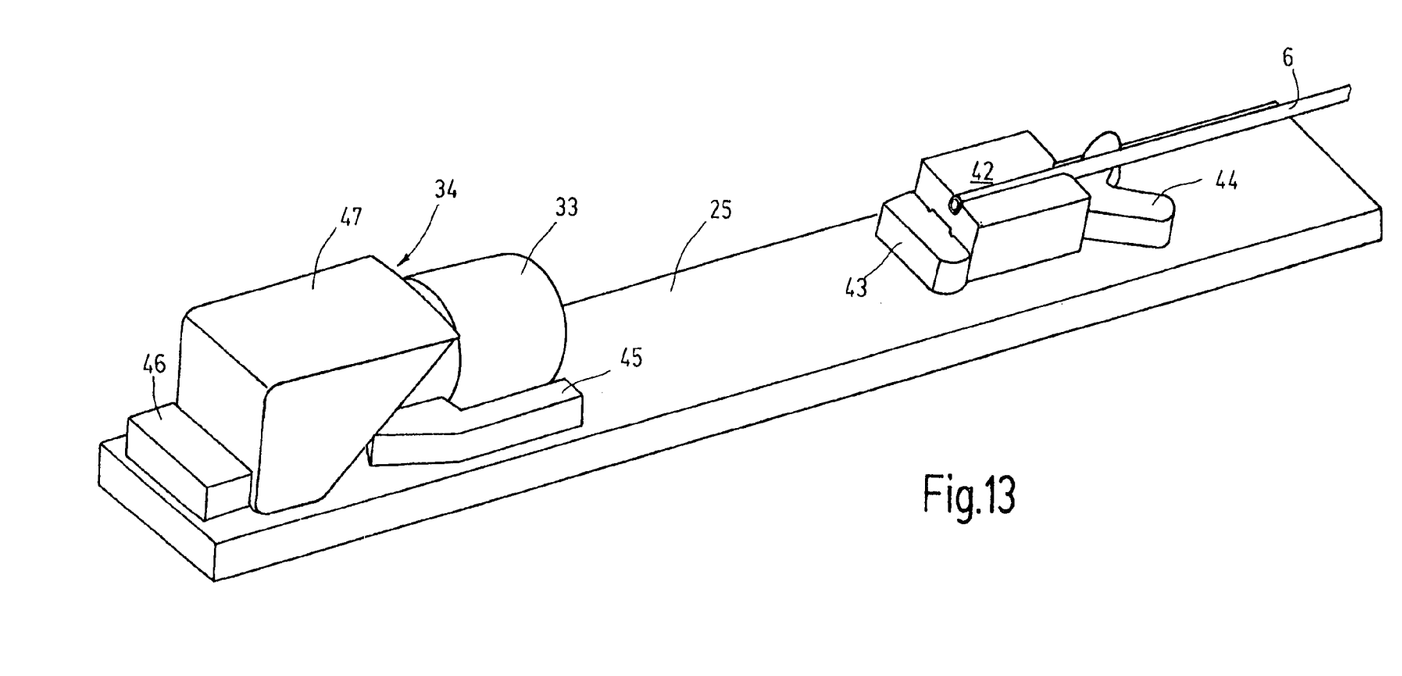

The optical fiber 6 is held in the holder block 42 as in the foregoing described embodiments. In this connection reference is made to the preceding discussion.

The embodiments according to FIGS. 11 to 13 show dot sensors which, as concerns reliability of process and technology, are very easy to manufacture and which provide for a very high detection accuracy.

It is also feasible to first perform a collimation and occasionally a pre-focusing by means of a GRIN lens or another diffractive lens, and the subsequent angular deflection is obtained by an obliquely positioned mirror in which, for focusing, the mirror-coated planar surface is provided with a diffractive structure. Collimation may also occur by means of a first boundary surface of an obliquely positioned hemispherical lens, where the angular deflection is obtained by the mirror-coated planar surface, in which a diffractive structure is provided. The final focusing is performed by two boundary surfaces of the obliquely oriented hemispherical lens.

A measuring head 4 according to the invention comprises the combination of a zone lens 26, which is preferably a diffractive lens, with a hemispherical lens 23 or a GRIN lens 33. This represents a concept capable of miniaturization, resulting in very slender measuring heads 4 having a high numeric aperture and, accordingly, leads to the best resolution capacity. Such measuring heads are insensitive to angular errors as concerns the orientation of the measuring head to the surface to be measured or to an oblique positioning of the surface relative to the optical axis of the measuring head.

What is claimed is:

1. A measuring head (4) for the optical measurement of a workpiece (2), comprising,
    a light source (8) for generating light having different spectral components,
    a light receiver (9) for receiving light reflected from the workpiece (2) and for analyzing the light concerning its spectral composition, at least one object lens (27) for receiving generated light from said light source(8) and for directing the generated light onto the workpiece (2) and for receiving light reflected from the workpiece (2) and for re-directing the reflected light from the workpiece (2) for reception by the light receiver (9), at least one optical wave guide (6) for optically connecting said light source (8) and said light receiver (9) with said at least one object lens (27), said at least one object lens (27) having a diameter less than 5 mm, said at least at one object lens (27) comprises:

a. a mirror (24, 34) for deflecting the light delivered by the optical wave guide (6) in a direction transverse to the optical wave guide (6);
b. at least one first focusing element (23, 33) disposed before said mirror (24, 34) as viewed from the light source (8);
c. a second element (26, 36) having a chromatic aberration and arranged in the light path of the object lens (27) in series with the first focusing element (23, 33) and behind the mirror (24, 34) or which is integrated with the mirror (24, 34), wherein the object lens (27) has a total numeric aperture (NA) equal to or greater than 0.1.

2. The measuring head (4) of claim 1, wherein at least two of the three parts of the object lens (27) as claimed in sub-paragraphs a., b., and c. of claim 1, with the first part being the mirror (24, 34), the second part being the at least one first focusing element (23, 33), and the third part being the second element (26, 36) are combined into a functional unit.

3. The measuring head (4) of claim 1, wherein the measuring head (4) is a micro-optical measuring head of hybrid design, in which at least one optical element (24, 23, 26, 36) is formed in a carrier (25) in which holder structures are formed for securing at least one of the other optical elements.

4. The measuring head (4) of claim 1, wherein the second element (26, 36) is a focusing diffractive element.

5. The measuring head (4) of claim 1, wherein the second element (26, 36) is a focusing zone lens.

6. The measuring head (4) of claim 1, wherein the first focusing element (23, 33) is a refractive element.

7. The measuring head (4) of claim 1, wherein the first focusing element (23, 33) is a collecting lens.

8. The measuring head (4) of claim 1, wherein the first focusing element (33) is a gradient index lens.

9. The measuring head (4) of claim 1, wherein the first focusing element (23) is a hemispherical lens.

10. The measuring head (4) of claim 9, wherein the mirror (24) is formed on a surface of the hemispherical lens (23).

11. The measuring head (4) of claim 10, wherein the mirror (24) surface is a planar surface.

12. The measuring head (4) of claim 1, wherein the object lens (27) has a numeric aperture greater than 0.3.

13. The measuring head (4) of claim 1, wherein the object lens (27) has a numeric aperture of 0.5 or greater.

14. The measuring head (4) of claim 1, further comprising a carrier (25) for fixedly holding the optical wave guide (6) and the optical elements (23, 33, 26, 36) relative to one another.

15. The measuring head (4) of claim 14, wherein the carrier (25) is formed of a transparent material on which the second optical element (26, 36) is formed.

16. The measuring head (4) of claim 1, wherein the measuring head (4) is formed as part of a confocal microscope.

17. The measuring head (4) of claim 1, wherein a plurality of optical wave guides (6) are operatively connected to a plurality of object lenses (27).

18. The measuring head (4) of claim 8, wherein between the gradient index lens (33) and the light outlet of the optical wave guide (6) a free air path or, in the alternative, a light-conducting solid element comprising a glass body, a glass rod, a plastic body, or a plastic rod is provided.

19. The measuring head (4) of claim 18, wherein the mirror (34) comprises a prism (35) having a mirror-coated base surface (36), between the gradient index lens (33) and the prism (35) a free air path or, in the alternative, a light-conducting solid element comprising a glass body, a glass rod, a plastic body, or a plastic rod is provided.

20. The measuring head (4) of claim 19, wherein the gradient index lens (33) is directly set on the prism (35) or is worked thereinto or, respectively, forms a part thereof.

21. The measuring head (4) of claim 1, wherein the end of the optical wave guide (6) defining the light outlet is itself formed as an optical element comprising a collecting lens.

* * * * *